United States Patent [19]

Nakamura et al.

[11] Patent Number: 4,688,221
[45] Date of Patent: Aug. 18, 1987

[54] ERROR RECOVERY METHOD AND APPARATUS

[75] Inventors: Katsunori Nakamura; Akira Kurano; Yoshiro Shiroyanagi; Shigeru Kishiro, all of Odawara, Japan

[73] Assignee: Hitachi, Ltd., Tokyo, Japan

[21] Appl. No.: 683,612

[22] Filed: Dec. 19, 1984

[30] Foreign Application Priority Data

Dec. 28, 1983 [JP] Japan ................... 58-250377

[51] Int. Cl.⁴ .................. G06F 11/14; G11C 29/00
[52] U.S. Cl. ................................. 371/13; 364/200
[58] Field of Search ................... 371/13, 12, 38; 364/200, 900; 360/53

[56] References Cited

U.S. PATENT DOCUMENTS

| | | | |
|---|---|---|---|
| Re. 31,069 | 10/1982 | Chang et al. | 360/53 |
| 3,688,274 | 8/1972 | Cormier et al. | 364/200 |
| 3,984,814 | 10/1976 | Bailey, Jr. et al. | 364/200 |
| 4,092,732 | 5/1978 | Ouchi | 364/900 |
| 4,439,859 | 3/1984 | Donnan | 371/32 |

Primary Examiner—Charles E. Atkinson
Attorney, Agent, or Firm—Beall Law Offices

[57] ABSTRACT

There is disclosed an error recovery apparatus and method for a data processing system having (1) a peripheral unit, for instance, a magnetic disc unit, for storing data in a plurality of blocks each having a unique address, (2) a main memory for storing data read from the peripheral units, and (3) a controller for controlling the transfer of the data blocks from the peripheral unit to the main memory by execution of a single channel command word (CCW) chain. When an uncorrectable error occurs in the transfer of a second or subsequent data block of the plurality of data blocks (not the first data block), the processor produces a new CCW chain to re-read the data block in error in addition to all the data blocks subsequent to the data blocking error and store these data blocks in the memory under the control of the new CCW chain.

14 Claims, 4 Drawing Figures

ERROR RECOVERY METHOD AND APPARATUS

BACKGROUND OF THE INVENTION

The present invention relates to an error recovery method and apparatus and more particularly to error recovery processing when a plurality of block data in a peripheral recording unit is transferred and stored in the main memory by the processing of a single command. Such a command is contained in a CCW chain or channel control word chain. A plurality of blocks of data, called records, are recorded on a disc media of a magnetic disc unit as one example of a peripheral recording unit. When a central processor unit (CPU) needs some data from the magnetic disc unit, the records are read from the disc medium and are stored temporarily in a main memory. The data is usually checked for errors whether transferring from the magnetic disc unit to the main memory or whether transferring from main memory to the disc unit. If there exists correctable errors in the data these errors are corrected automatically and the corrected data is stored in the main memory.

On the other hand, when there exists uncorrectable errors in the data read from the magnetic disc unit, it is necessary to retransfer the data read from the magnetic disk unit to the main memory. In this case, it is useful to process the data by command retries, such as input-output command retries. With respect to a command retry, the same command is processed repeatedly between a channel and the disc controller without processing by the CPU. Such a system is disclosed in U.S. Pat. No. 3,688 274.

Errors which are the object of command retries by a disc controller include uncorrectable reading errors, the overrun of a disc-drive device for a channel caused by timing errors between the disc controller and the CPU, partially correctable erroneous data input, etc.

When an error which can be recovered by a command retry is generated, the disc controller requests a command retry for the channel by recalling a previous CCW and relocates the magnetic head at the data record which proved erroneous to read or write the data from or to the disc. During this time, recovery processing is done according to the error content. For instance, when the error cannot be recovered after several retries, the magnetic head of the disc unit is slightly shifted in a direction perpendicular to the track to reread the data.

In command retry processing of the disc controller described above, the data record relocated by the magnetic head during the retries is limited to the last single data record that had been processed immediately beforehand. In the case where a single data record is processed by any command, the data record that proved to be in error is the record processed immediately beforehand. This limitation results primarily from the control system of the relocation mechanism of the disc unit and does not raise any problems when only one data record is processed during execution of the CCW chain containing a single command.

If a plurality of data records is required for processing one command and, moreover, if any errors occur in any but the first record of a plurality of records (i.e. a second or subsequent record), command retry cannot be executed. This is because, although a command retry must reexecute the command from the beginning, or it must reexecute the transfer of the required data records from the beginning, the disc controller cannot relocate the initial data record because it is not the data record processed immediately beforehand. When the command retry cannot be executed in the above case, the disc controller stops processing the command and informs the CPU of the error situation. The CPU usually generates a command to recover the error after receiving the information of the error from the disc controller. However, the disc controller repeats only the command retry under the command control from the CPU and nothing happens because of the limitation discussed above. No error recovery takes place.

Since the disc controller does not execute any recovery processing in this case, there is a strong probability that the same error will occur again in the same data record.

As described above, when the data necessary for processing one command covers a plurality of data records, and when an input-output error occurs in the second or subsequent data block, a problem occurs in that recovery can not be provided because it is the second or subsequent data block that contains the error even if it is an input-output error that should be recovered by a command retry.

SUMMARY OF THE INVENTION

One object of the present invention is to provide an error recovery apparatus which can recover an input-output error that should originally be recovered by a command retry even if the input-output error occurs in an input-output command which requires data from a plurality of data blocks or records for processing.

If an uncorrectable error occurs in the first data block, the data in the first block can be processed by execution of the existing input-output command.

According to the present invention, data blocks that have been processed normally do not need to be processed again if the input-output error occurs in the second or subsequent data block, and command retry can be applied directly to the data block in error when the data block which proved to contain the input-output error is made the first record retrieved by a new CCW chain. When an input-output error occurs in a second or subsequent data block, a new input-output command is produced so that the data block containing the input-output error is designated as the first record of the processing. Accordingly, the data blocks or records following the data block containing the input-output error are processed by the new input-output command to complete the execution intended by the first CCW chain containing a single command.

DESCRIPTION OF THE PREFERRED EMBODIMENTS

Hereinafter, one preferred embodiment of the invention will be described in detail with reference to the accompanying drawings.

Figure 1:
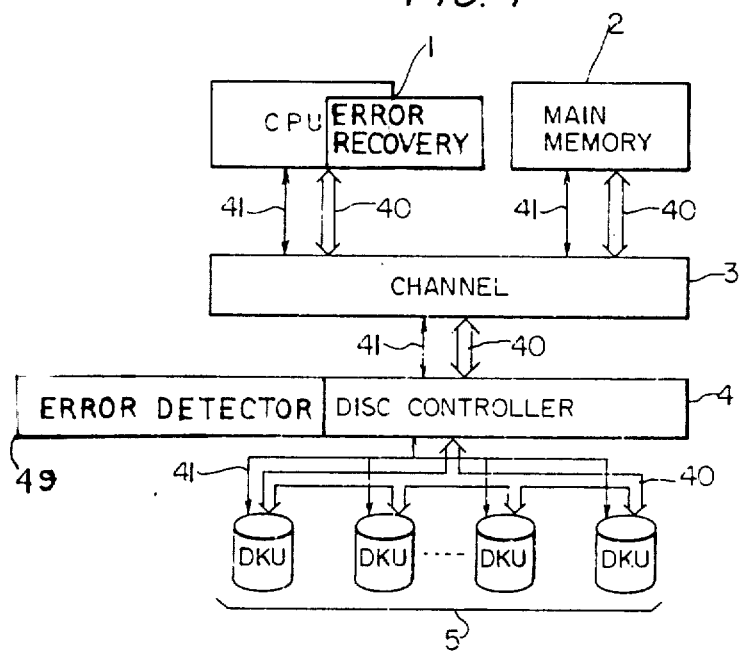
FIG. 1 shows roughly the construction of a computer system having disc units as one embodiment of the present invention.

FIG. 1 illustrates the construction of a computer system as one embodiment of the present invention. The drawing shows a CPU 1, a main memory 2, a channel 3, a disc controller 4, and disc units 5. These units 1-4 are connected to each other by data buses 40 and control signal lines 41.

Figure 2:
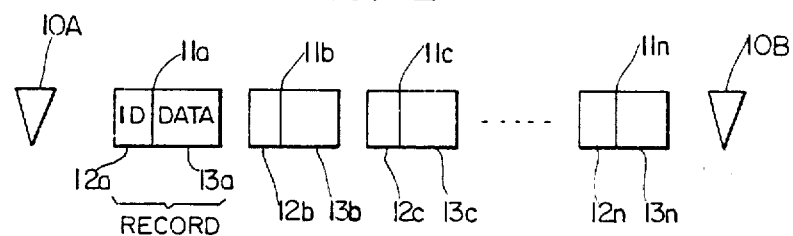
FIG. 2 the record format in a disc medium of a disc unit.

FIG. 2 illustrates part of one track of one disc medium in a disc unit. The figure illustrates the case in which there are n data blocks (hereinafter called "records") 11a, 11b..., 11n in one track of a disc medium. Each record usually has an index portion (ID) on which is recorded index information including an address for record identification and its length, and a data portion (DATA) of recorded data. The ID portions are usually used as addresses for accessing specific records. Reference numerals 12a, 12b... 12n denote the ID portions of the records 11a, 11b... 11n, respectively, and reference numerals 13a, 13b... 13n denote the data portions of the records 11a, 11b... 11n, respectively. Reference numerals 10A and 10B denote index markers.

Figure 3:
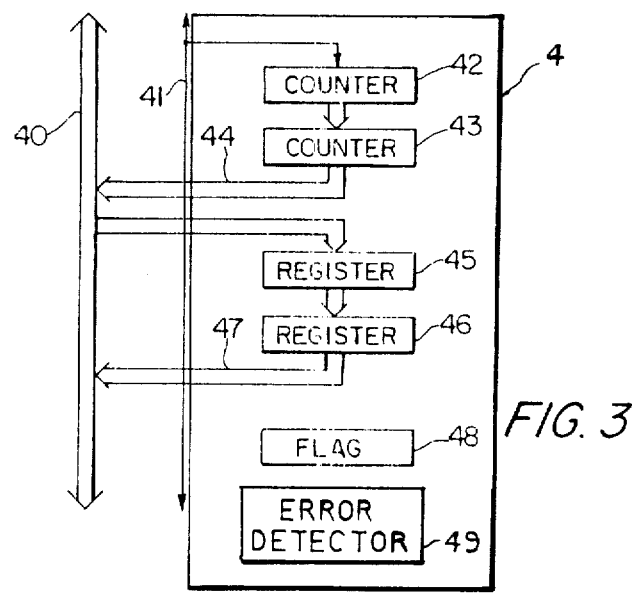
FIG. 3 shows a block diagram of a disc controller of the present invention.

FIG. 3 illustrates the internal construction of the disc controller concerning the present invention. Reference numeral 40 denotes a data bus used for transferring data between the channel 3 and the disc units 5, and for transferring input-output control data between the channel 3 and the disc controller 4. Reference numeral 41 denotes a control signal line used for input and output between the channel 3 and the disk unit 5. Reference numerals 42 and 43 denote counters counting the number of data units in each record transferred between disc units 5 and channel 3 to main memory 2, and 45 and 46 denote registers retaining the ID portions of the records. Reference numerals 44 and 47 denote data buses used for transferring the contents of counter 43 and register 46 to the data bus 40. Reference numeral 48 denotes an internal control flag of the disc controller 4.

The functions of the internal control flag 48, counters 42 and 43, and registers 45 and 46 of the disc controller 4 will now be described.

The internal control flag 48 indicates whether the record that is now being processed is the first record or a second or subsequent record when a plurality of records are processed by one input-output command. It is reset automatically before the first record is processed, and is set at the beginning of the processing of the second record, after the first record has been processed successfully.

The counter 42 counts the number of data units in the record currently exchanging input-output with the channel 3. It is reset by a control signal transferred through control signal line 41 before the start of the input-output of a certain record, and is incremented by the control signal whenever one data unit (usually 1 byte) is input or output. The counter 43 indicates the total number of data units that have been transferred successfully (with no error) when a plurality of records are being processed by one input-output command (CCW chain). It is reset when the transfer of the first record is started, and the count of the counter 42 is thereafter incremented by a count equal to the number of bits in the record transferred whenever the transfer of each record is completed without error.

Registers 45 and 46 are registers which store or retain the ID portions of the records transferred through the data bus 40. Register 45 retains the ID portion of the record that is currently being processed, and the storage of the ID portion is done simultaneously with the transfer of the content of the ID portion to the channel 3 when the ID portion is input to the main memory 2, and simultaneously with the transfer of the content of the ID portion to the disc unit 5 when the ID portion is output to the disc unit 5.

Incidentally, the ID portion of a record is sometimes not necessary for processing a command, depending upon an input-output command, but even in such a case, the ID portion should always be read by the disc controller 4 and similarly retained in register 45 to carry out the present invention.

The content of register 45 is transferred to register 46 when the input-output of the record ends normally. In other words, register 46 has the function of storing the ID portion of the record which was processed immediately before the record that is currently being processed.

Figure 4:
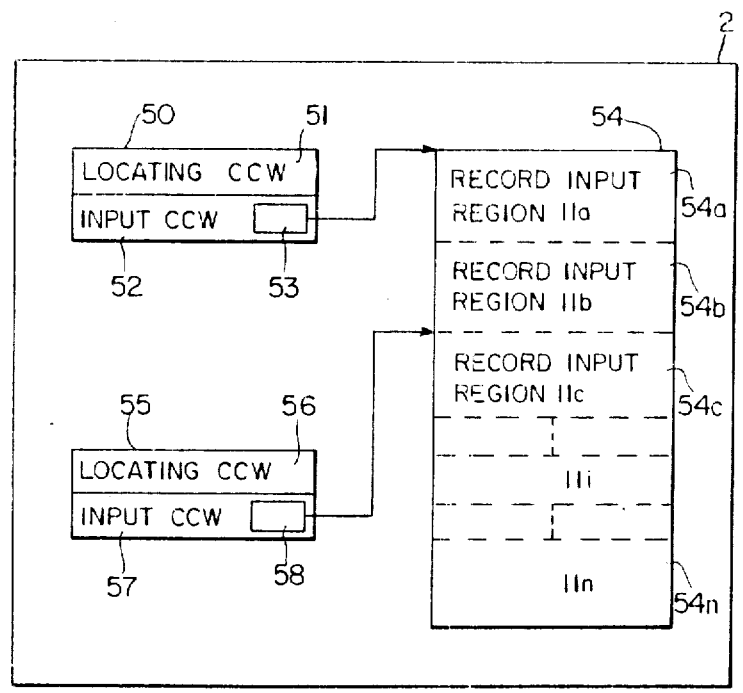
FIG. 4 shows the data configuration within a main memory.

FIG. 4 illustrates roughly the data configuration of the main memory 2.

A series of commands 50 (hereinafter called a "CCW chain") detailing the input-output processing shown in FIG. 4 is stored in the main memory 2. Input regions 54, which include input regions 54a-54n, relating to the records 11a through 11n, are prepared in the main memory 2 to store data therein. The CCW chain 50 includes locating CCW 51 specifying the location of the read-write head of the disc unit to find the first record 11a of the track, and an input CCW 52 specifying the input of records 11a through 11n. The input CCW 52 contains a pointer 53 specifying the leading address of the input region 54. Additionally, a CCW chain 55 is prepared by referring to the contents of the counter 43, register 46 and the input CCW 52 as a new CCW chain when an input-output error occurs in a certain second or subsequent record 11i, in this case, 11c. It is similar to the CCW chain 50, having a locating CCW 56, an input CCW 57 and a pointer 58, for inputting the records 11i through 11n.

The operation of the embodiment of this construction will now be described.

The CPU 1 issues an input-output command to the channel 3 through the control signal line 41 when input-output processing with respect to the disc units 5 becomes necessary during the execution of a program. To simplify the description, it is assumed that the input-output command starts from record 11a of the track shown in FIG. 2, and all the records as far as record 11n are read from a disk unit 5 and are input in an input region 54 of main memory 2.

When the channel 3 receives the input-output command from the CPU 1, the channel 3 sequentially reads out the locating CCW 51 and the input CCW 52 of the CCW chain 50 stored in the main memory 2 and transmits them to the disc controller 4. The disc controller 4 locates the read-write head of the disc unit 5 at a position in front of record 11a of the track, in accordance with the locating CCW 51.

Records 11a through 11n are then read out sequentially from the disc unit 5 in accordance with the input CCW 52, and are transferred to the channel 3. The channel 3 writes sequentially the data received from the disc controller 4 in the input region 54 of the main memory 2.

As data is stored in main memory 2, the data is checked for errors by error detector 4a. If no error is detected in any record during the processing of input to CCW 52, the data is stored in main memory 2. If some correctable errors are detected by error detector 4a in any record the corrected data is stored in the main memory after automatic correction If an uncorrectable error is detected in the first record, the data in the first record is rewritten by execution of the existing CCW 50. On the other hand, suppose an uncorrectable error occurs in the second or subsequent record, for instance, in record 11c, during the processing of the input CCW 52. In this case, the internal control flag 48, the counter 43, and the register 46 are useful for error recovery. The internal control flag 48 has already been set and the total number of data units in records 11a and 11b have been stored in counter 43, and the ID portion 12b of record 11b has been stored in register 46. The input of record 11a and the input of the record 11b to input regions 54a and 54b, respectively, of the data input region 54 have ended normally for the processing of the input CCW 52.

Since the internal control flag 48 is set, the disc controller 4 knows, by referring to the internal control flag 48, that a command retry by existing CCW 50 cannot be done because the record is not the first record even though the input error requires the command retry. This is because the re-input from record 11a must be done in order to execute a command retry, but the disc controller 4 cannot relocate the position of record 11a, as described earlier.

The disc controller 4 ends the processing of input CCW 52 and an error status is indicated by detector. This error status is transmitted to the CPU 1 through the control signal line 41 and the channel 3, and the CPU 1 activates an error recovery program in response.

The error recovery program requests the receipt of detailed error information in the disk controller 4 through the channel 3. The disk controller 4 transfers the detailed error information to the CPU 1 in response to the request. The detailed error information in this case includes the contents of counter 43 and register 46, the information indicating whether or not the input processing of the input command has been completed, etc., as well as the type of error.

The error recovery program learns from the detailed error information that the input processing by the input command has not been completed. Then the information in counter 43 and register 46 and CCW 52 of FIG. 4 can be used by the CPU to prepare the new CCW chain 55 and store it in main memory 2. The new CCW 55 controls the input of records 11c through 11n by making direct access to record 11c as the first record transferred by new CCW 55.

The locating CCW 56 of the CCW chain 55 commands the retrieval of record 11c and a relocation of the record 11c. The input CCW 57 includes a pointer 58 that points to a leading address of a region 54c to which record 11c should be originally input, as its input region.

The ID portion of record 11b is stored or retained in register 46 as retrieval data for the location to record 11c. The data successfully input to the input region 54 has been sequentially packed thereinto from the leading address thereof. In other words, if the leading address of the data input region 54 and the length of regions 54a and 54b that have already been input successfully are known, the leading address of the region to which record 11c should be input can be determined. The input CCW 52 includes the leading pointer 53 of the data input region 54, and the content of counter 43 indicates the total length of the input regions 54a and 54b. The CCW chain 55 is prepared in accordance with the leading pointer 53 and the content of counter 43 and register 46.

The error recovery program prepares the CCW chain 55, as described above, and issues an input command.

The channel 3 and the disc controller 4 start to receive the input from record 11c, that has previously proved to contain an error, by the CCW chain 55.

It is not possible in this case to determine whether record 11c can be input normally or not, but even if the same input error is generated, a command retry can be executed between the channel 3 and the disc controller 4, because record 11c is the first record processed by new CCW 55. Accordingly, recovery can be done accurately if this error is one that can be recovered from by a command retry.

The embodiment described above deals with the case of a command in which all the records in one track are input, as an example of an input-output command using a plurality of records as the object of its processing. However, this could be an output-processing command, or the records which are the object of the processing may be within a plurality of tracks. Furthermore, a plurality of records acting as the object of the processing need not be physically continuous on the recording medium in the disc unit, so long as a logical continuity, which the disc controller can recognize, links these records.

In the embodiment described above, the operations of the internal control flag 48, counters 42 and 43, and registers 45 and 46 are realized by the hardware of the disk controller 4, but they can, of course, be realized by a microprogram.

We claim:

1. An error recovery apparatus in a data processing system comprising:
    a peripheral unit for storing data in a plurality of data blocks, each of said data blocks having a unique address;
    a memory for storing a first channel command word (CCW) chain, said memory having storage areas for storing data transferred from said peripheral unit;
    a controller connected between said memory and said peripheral unit for reading said data blocks from said peripheral unit and transferring said data blocks to said memory to store said data blocks in said storage areas determined by said first CCW chain, said controller having detecting means to detect an uncorrectable error in the transfer of the second or subsequent data block of said plurality of data blocks, and;
    processing means connected to said controller for generating a new CCW chain when an uncorrectable error occurs in a second or subsequent data block of said plurality of data blocks.

2. An error recovery apparatus in a data processing system comprising:
    a peripheral unit for storing data in a plurality of data blocks, each of said data blocks having an address;
    a memory for storing a first channel command word (CCW) chain, said memory having storage areas for storing data transferred from said peripheral unit;
    a controller connected between said memory and said peripheral unit for reading said data blocks from said peripheral unit and transferring said data blocks to said memory to store said data blocks in said storage areas determined by said first CCW chain, said controller having detecting means to detect an uncorrectable error in the transfer of the second or subsequent data block of said plurality of data blocks;

a first register connected to said controller for storing the total number of data units in all data blocks successfully transferred to said memory;

a second register connected to said controller for storing the address of the data block currently being transferred from said peripheral units to said memory; and processing means connected to said controller for generating a new CCW chain when an uncorrectable error occurs in a second or subsequent data block of said plurality of data blocks, said new CCW chain generated by said processing means by considering the contents of said first register, the contents of said second register, and said first CCW chain.

3. The error recovery apparatus according to claim 2 wherein said detecting means comprises:

flag means for indicating whether data in one of said blocks currently being read from said peripheral unit for storing in said memory is a first data block or a second or subsequent data block, and further, wherein said processing means recognizes the block in which said uncorrectable error occurs.

4. The error recovery apparatus according to claim 2, wherein said peripheral unit is a magnetic disc unit and wherein each said block is defined as a record having a unique ID portion indicating the address thereof and a data portion in which to record data.

5. The error recovery apparatus according to claim 2, wherein said first register comprises:

counter means for counting the number of data units transferred from said peripheral unit to said memory, said first register storing the total number of data units from a plurality of records counted by said counter means.

6. An error recovery method for a data processing system that includes a peripheral unit to store data in a plurality of data blocks each having a unique address, a memory for storing a first channel command word (CCW) chain and having storage areas to store said data blocks, and a controller for transferring a plurality of data blocks between said peripheral units and said memory comprising:

reading said plurality of data blocks from the peripheral units according to said first CCW chain;

writing said plurality of data blocks to said memory under the control of said first CCW chain;

detecting uncorrectable errors in the said data read from said peripheral unit;

counting the total number of data units in each of said data blocks correctly written in said storage area of said memory;

retaining the address of the data block currently read from the peripheral unit;

stopping said counting and said retaining when an uncorrectable error is detected;

generating, in response to the detection of an uncorrectable error, a second CCW chain determined by said first CCW chain, the total number of data units correctly written, and the address of the last correctly transferred data block;

reading the data blocks subsequent to the last correctly transferred data block under the control of said second CCW chain; and writing said subsequent data blocks into said memory under the control of said second CCW chain.

7. The error recovery method according to claim 6 wherein said step of detecting further comprises:

indicating whether said data block currently being read from said peripheral unit is a first data block or a second or subsequent data block, and wherein said generating step further comprises generating a second CCW chain only when said data block currently being read is a second or subsequent data block.

8. The error recovery method according to claim 6 wherein said first reading step reads data from each data block, each data block having an ID portion indicating the address of said data block and a data portion in which to record data, and wherein said retaining step retains the ID portion of said data block.

9. The error recovery method according to claim 7 further comprising, after said indicating step, re-reading data in said first data block using said first CCW chain when errors occur in said first step.

10. The error recovery method according to claim 6 further comprising:

storing temporarily said second CCW chain in the memory after generating said second CCW chain.

11. A method of transferring data between a magnetic disc unit on which data is stored in uniquely addressed records and a main memory directed by a controller, said main memory storing a first channel command word (CCW) chain and having storage areas for storing said records, comprising:

reading a plurality of said uniquely addressed records by the execution of a single command contained in a first CCW chain;

storing said records in said memory under the control of said first CCW chain when no errors or correctable errors occur in said records;

detecting whether uncorrectable errors occur in a first record or in a second or subsequent record of said plurality of records transferred by said first CCW chain;

retaining the address of the record from which data was read in error and the address of the location in the main memory where uncorrectable errors have occurred in transferring a second or subsequent record;

retaining the amount of data successfully transferred to said main memory under the control of said first CCW chain;

producing a second CCW chain according to said retained addresses and said amount of successfully transferred data, and said first CCW chains, and;

transferring said record in which uncorrectable errors occurred and any subsequent records required by said first CCW chain under the control of said second CCW chain.

12. The data transfer method according to claim 11 wherein said detecting step further comprises:

checking for the presence of errors in a plurality of data records transferred under the control of a single command;

recognizing whether uncorrectable errors occur in any said record of said plurality of records; and indicating whether the recognized uncorrectable error occurs in the first record of said plurality of records or in a second or subsequent record of said plurality of records.

13. The data transfer method according to claim 11, further comprising, after the step of producing said second CCW chain:

storing temporarily said second CCW chain in said memory.

14. The data transfer method according to claim 11, further including, after said detecting step, the step of:

re-reading data in said first record under the control of said first CCW chain when an uncorrectable error occurs in said first record.

* * * * *